United States Patent
Fox (10) Patent No.: US 7,469,876 B2
(45) Date of Patent: Dec. 30, 2008

(54) LOCK VALVE; A METHOD AND SYSTEM FOR SECURING A VALVE DEVICE

(76) Inventor: Peter Michael Fox, 959 E. Caribbean Dr., Summerland Key, FL (US) 33042

(*) Notice: Subject to any disclaimer, the term of this patent is extended or adjusted under 35 U.S.C. 154(b) by 335 days.

(21) Appl. No.: 11/376,511

(22) Filed: Mar. 16, 2006

(65) Prior Publication Data

US 2007/0215213 A1    Sep. 20, 2007

(51) Int. Cl.
*F16K 35/00* (2006.01)
(52) U.S. Cl. .......................... 251/90; 251/292
(58) Field of Classification Search ................. 137/365, 137/367, 369, 370, 371, 362, 363, 383; 251/291–293, 251/90
See application file for complete search history.

(56) References Cited

U.S. PATENT DOCUMENTS

| | | | | |
|---|---|---|---|---|
| 3,658,086 A * | 4/1972 | Hart | ............................ | 137/368 |
| 4,497,344 A * | 2/1985 | Kisiel | ............................ | 137/797 |
| 4,534,378 A * | 8/1985 | Gagas et al. | ................ | 137/367 |
| 4,572,236 A * | 2/1986 | Baker | ........................... | 137/364 |
| 4,987,924 A * | 1/1991 | Rush et al. | ............. | 137/614.18 |
| 5,072,750 A * | 12/1991 | Poms et al. | ................. | 137/296 |
| 5,577,531 A * | 11/1996 | Hayden et al. | ............... | 137/369 |
| 5,775,365 A * | 7/1998 | Hayden et al. | ............... | 137/369 |
| 5,967,171 A * | 10/1999 | Dwyer, Jr. | ................. | 137/78.1 |
| 5,996,613 A * | 12/1999 | Bertolotti | ..................... | 137/383 |
| 6,070,609 A * | 6/2000 | Becker | ....................... | 137/377 |
| 6,109,292 A * | 8/2000 | Fox | .............................. | 137/296 |
| 6,263,903 B1 * | 7/2001 | Sjoberg | ....................... | 137/364 |
| 6,315,267 B1 * | 11/2001 | Zajac et al. | .................... | 251/69 |
| 6,450,479 B1 * | 9/2002 | Reynolds et al. | ............ | 251/291 |
| 6,659,419 B2 * | 12/2003 | Chatufale | ..................... | 251/14 |
| 6,662,821 B2 * | 12/2003 | Jacobsen et al. | ............ | 137/312 |
| 6,886,805 B2 * | 5/2005 | McCarty | ....................... | 251/214 |
| 6,935,615 B2 * | 8/2005 | McCarty | ....................... | 251/214 |
| 7,322,563 B2 * | 1/2008 | Stehling et al. | .............. | 251/292 |

* cited by examiner

*Primary Examiner*—John Rivell
*Assistant Examiner*—Cloud K Lee

(57) ABSTRACT

A method and system for securing the exposed valve actuation portion of the valve system in order to restrict the unauthorized use therefrom; including a first device keying the exposed valve actuation portion, a second device, containing the exposed portion of the keyed valve actuation, a third keyed device for locking the valve actuation portion within the second device, a fourth keyed device for actuating the pressure adjustment portion, a fifth device for maintaining ease of rotation, a sixth device for securing the third device to the existing valve system, and a seventh device for engaging and operating the first and/or third devices.

20 Claims, 9 Drawing Sheets

Exploded View: Modified
Typical Valve Device

Section : Typical Valve Device

Figure 1

Section : Typical
Valve Device

Figure 2A

Exploded View : Modified
Typical Valve Device

Figure 2B

Section : Typical
Pressure Reducing Device
Figure 4A

Section : Typical
Pressure Reducing Device
Before Pressure Setting
Figure 4B

Section : Modified Pressure Reducing Valve

Figure 5A

Exploded View: Modified Pressure Reducing Valve

Figure 5B

Section : Typical
Pressure Reducing Device

Figure 6A

Section : Typical
Pressure Reducing Device
Before Pressure Setting

LOCK VALVE; A METHOD AND SYSTEM FOR SECURING A VALVE DEVICE

BACKGROUND OF THE INVENTION

1. Field of the Invention

This application claims priority to U.S. Pat. Nos. 5,941,274 and 6,109,292 and relates to a system for locking a value device against unauthorized usage by the public and/or terrorists.

2. Discussion of Background

In recent years, a system has been developed for liquids and/or gases at pre designated locations throughout most of the populated areas and in industry. The system utilizes piping to supply liquids and/or gases to these locations and a valve system to be used to regulate the flow when necessary. The valve system consists of a valve mechanism, an exposed valve actuation portion and a valve containment body. The valve mechanism is typically located within the valve containment body. The valve actuation portion, utilized for actuating the valve mechanism, is typically located at the top of the valve containment body and exposed for usage by authorized personnel. The valve containment body is manufactured so that pipes and/or hoses can be attached and sealed tight so that the liquid or gas is forced out of the pipe and/or hose attachment openings by pressure when the valve is opened.

However, the above, as well as other systems, utilize an exposed valve stem that can be operated by means of a standard wrench or any vise like apparatus when attached to the exposed sides of the valve actuation portion and rotated. The existing system in many occasions results in operation by unauthorized personnel; resulting in damage to the system and/or bodily injury.

SUMMARY OF INVENTION

Accordingly, one object of this invention is to provide a novel system and method for preventing accidents due to accidental and/or unauthorized actuation of the valve system.

Another object of this invention is to provide a novel system and method for securing the exposed valve actuation portion of the valve system.

Another object of the present invention is to provide a novel method and system for securing and/or adjusting the pressure regulation portion of the valve system.

Another object of this invention is to provide a novel system and method for maintaining system pressure and/or flow through restriction of unauthorized usage.

Another object of this invention is to provide a novel system and method for securing any valve device to avoid potential risks and subsequent damage due to unauthorized actuation of the valve device.

It is yet another object of the present invention to provide a system and method for modifying the existing valve systems so that unauthorized usage is deterred.

Another object of the present invention is to provide a novel method and system for securing the valve system in a fail-safe manner.

It is noted that one objective of the present invention is to establish a basic method and system for supplying liquid and/or gas through means of a valve system which is secured from actuation from the public.

The above and other objectives are achieved according to the present invention by providing a new and improved method for securing the exposed valve actuation portion and/or pressure setting portion of the valve system.

Accordingly a first aspect of the present invention, is to modifying an existing valve system so that the exposed valve actuation portion and/or pressure setting portion of the system is/are secured from unauthorized usage.

Accordingly a second aspect of the present invention, is to provide a new and improved system to act as the valve actuation portion and/or the pressure setting portion of the valve system.

Accordingly a third aspect of the present invention, is to provide a new and improved system to secure the exposed actuation portion of the valve system so that it can only be actuated by a keyed actuation wrench.

Accordingly a fourth aspect of the present invention, is to provide a new and improved system to secure the actuation portion of the valve system by means of one or a plurality of keyed locking modules which can only be actuated by a keyed actuation wrench.

Accordingly a fifth aspect of the present invention, is to provide a new and improved system to secure a pressure adjustment portion of the valve system.

Accordingly a sixth aspect of the present invention, is to provide a new and improved system to secure the pressure adjustment portion of a valve system so that it can only be actuated by a keyed actuation wrench.

Accordingly a seventh aspect of the present invention, is to provide a new and improved system to secure the valve system so that the locking module must be overcome before actuation of the valve can be accomplished.

Accordingly a eighth aspect of the present invention, is to provide a new and improved system wherein if the keyed actuation portion is forced to rotate before the locking module is released it can only be actuated into a fail safe position.

Accordingly a ninth aspect of the present invention, is to provide a new and improved valve mechanism for securing a valve device to prevent unauthorized actuation by the unauthorized personnel such as utilized in the biological industry, chemical industry, petrochemical industry, nuclear industry, hydroelectric industry, refinery industry, etc.

BRIEF DESCRIPTION OF THE DRAWINGS

A more complete appreciation of the invention and many of the intended advantages thereof will be readily obtained as the same becomes better understood by reference to the following detailed descriptions when considered in conjunction with the accompanying drawings, wherein.

DESCRIPTION OF THE PREFERRED EMBODIMENTS

Figure 1:
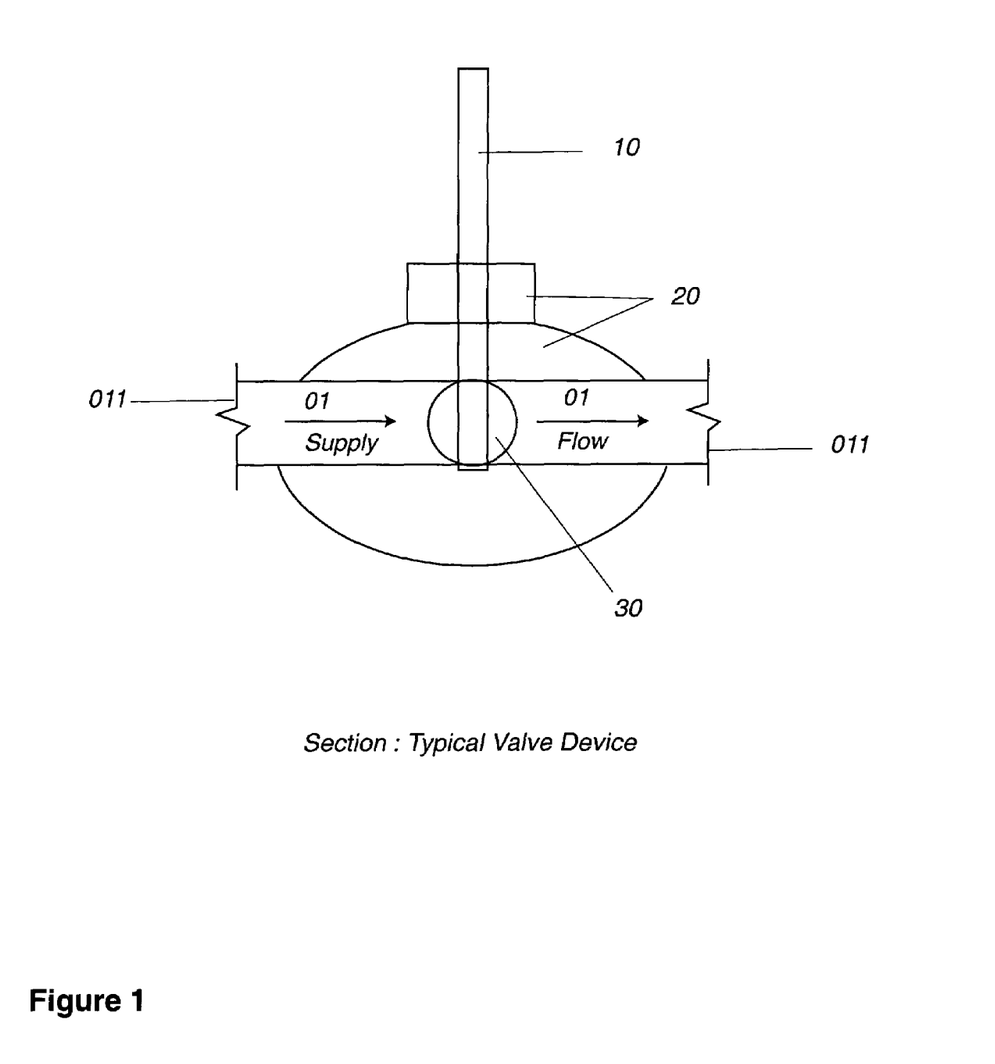
FIG. 1 illustrates a sectional view through an existing valve system.

Referring now to the drawings, wherein like reference numerals designate identical on corresponding parts throughout the several views, and more particularly to FIG. 1 thereof there is illustrated a standard valve system.

Referring to FIG. 1, a sectional view of the standard valve system is illustrated depicting a rotational actuation portion 10, valve containment body 20, supply flow 01, supply flow connection 011, and a flow control portion 30. When the rotational actuation portion 10 is rotated by means of the rotational actuation portion, it opens the flow control portion, pressurizing valve containment body 20 thereby controlling supply flow 01, forcing the liquid and/or gas to the connection portions 011. Wherein a rotational force applied to the rotational actuation portion 10 shall actuate the supply/flow 01 of liquid and/or gas.

Figure 2A:
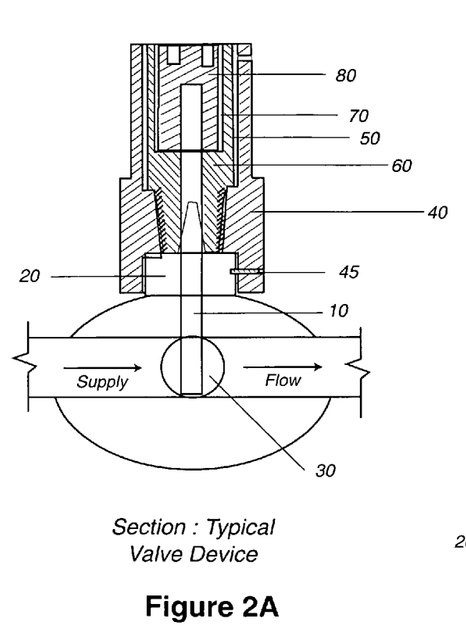
FIG. 2 illustrates a sectional view of the modified valve system configuration according to the present invention.

Referring to FIG. 2A, a sectional view of the standard valve system has been modified utilizing a keyed actuation module 80 fit to the existing rotational activating portion 10, a keyed rotational locking module 60, a bearing system 50 & 70 allowing unrestricted rotation, a non rotatable closure module 40, and tamperproof attachment 45 for securing the non rotatable closure module to the valve containment body 20. Wherein a rotational force applied to the keyed actuation module 80 shall actuate the supply/flow 01 of liquid and/or gas, and a second rotational force applied to the keyed rotational locking module 60 shall actuate the means of engaging the existing rotational actuation portion 10 and the non rotatable closure module 40.

Figure 2B:
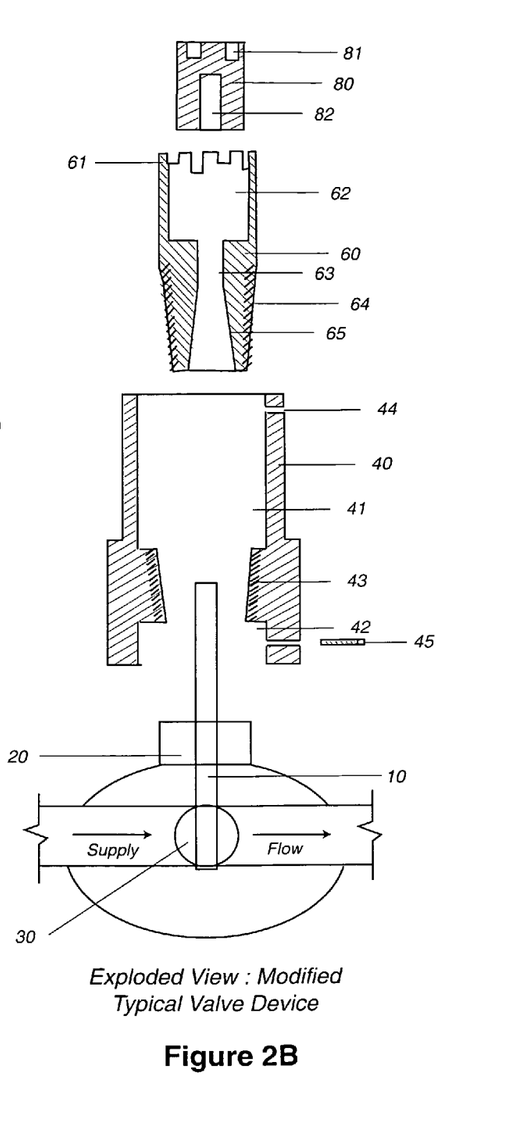

Referring to FIG. 2B, an exploded assembly view of the standard valve system has been modified utilizing the keyed actuation module 80, having a first keyed portion 81 and a second keyed portion 82 to fit over and around the rotational actuation portion 10, a keyed rotational locking module 60, having a first keyed portion 61 and a means for engaging a closure module 40, an opening 62 for receiving the keyed actuation module 80, an opening 63 for receiving the rotational actuation portion 10, a tapered portion 65 to act as a compression stop, a non rotatable closure module 40, having an opening 41 for receiving the keyed rotational locking module 60 and an opening 42 for receiving a portion of the valve containment body 20, a means of attachment 45, a weep system 44. Wherein a rotational force can only be applied by means of a keyed wrench system; by means of applying a rotational force to the keyed opening portion 81, a second means of security is provided by means of a separate rotational force applied to the keyed locking portion 61 engaging the adjustment portions 43 and 63 adjusting the pressure on the tapered portion 65 thereby limiting and/or allowing actuation of the rotatable actuation portion 10.

Figures 3A, 3B:
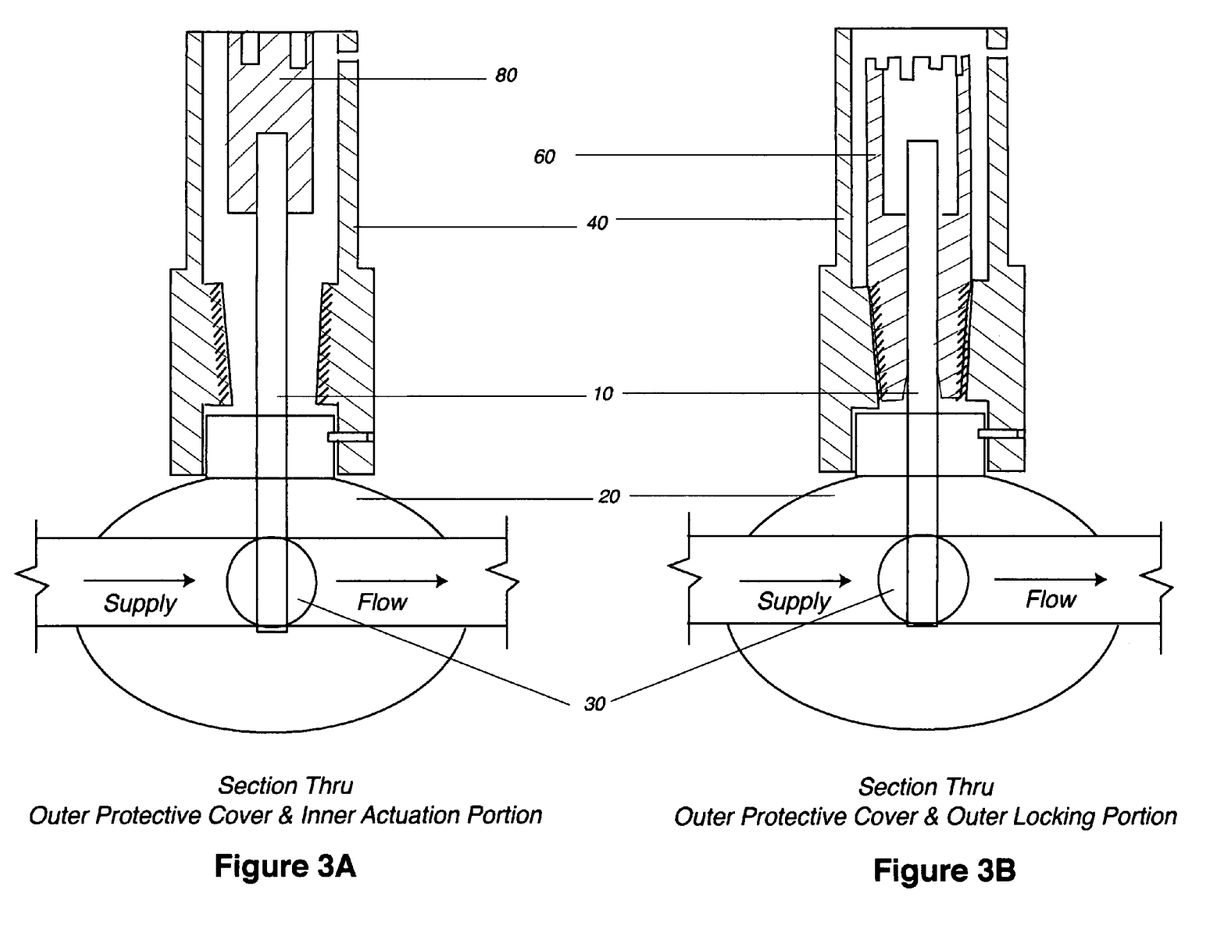
FIG. 3 illustrates a sectional view of the stages of assembly of the modified valve system configuration according to the present invention.

Referring to FIG. 3A, section of a modified standard valve system has been depicted illustrating the non rotatable closure module 40 engaged with the containment body 20, and the keyed actuation module 80 engaged with the rotational actuation portion 10.

Referring to FIG. 3B, section of a modified valve system has been depicted illustrating the non rotatable closure module 40 engaged with the containment body 20, and the keyed locking portion 60 engaged with the non rotatable closure module 40 thereby engaging and limiting actuation of the rotational actuation portion 10.

Figure 4A:
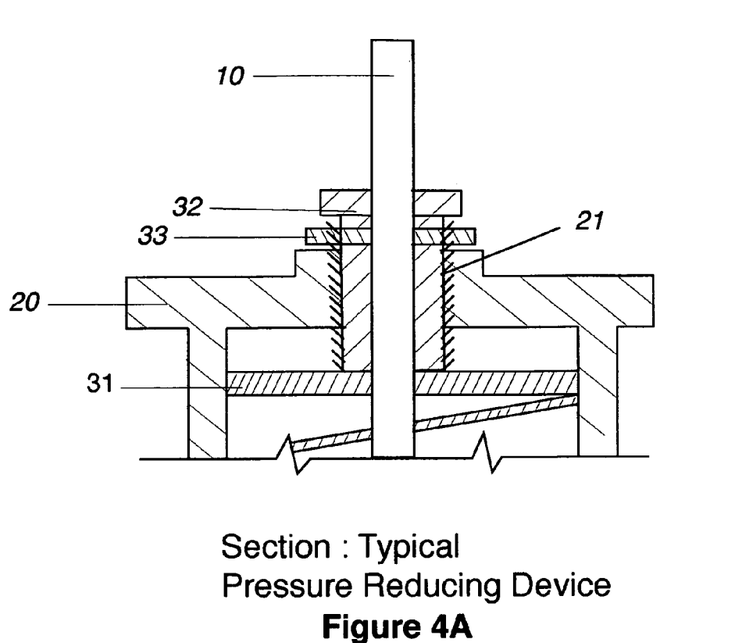
FIG. 4 illustrates a sectional view of a standard pressure reducing valve system.

Referring to FIG. 4A, a sectional view of a typical pressure reducing valve is depicted indicating a rotational actuation portion 10, a valve containment body 20, a flow restriction means 31, a supply flow adjustment screw 32, a means of engagement and adjustment means with the valve containment body portion 21, a locking portion 33. Wherein a rotational force applied to the supply flow adjustment screw 32 dictates pressure of flow, and a rotational force applied to the rotational actuation portion 10 regulates volume of flow. Wherein a rotational force applied to the rotational actuation portion 10 shall actuate the supply/flow 01 of liquid and/or gas, and a second rotational force applied to the supply flow adjustment screw 32 shall actuate the flow restriction means 31.

Figure 4B:
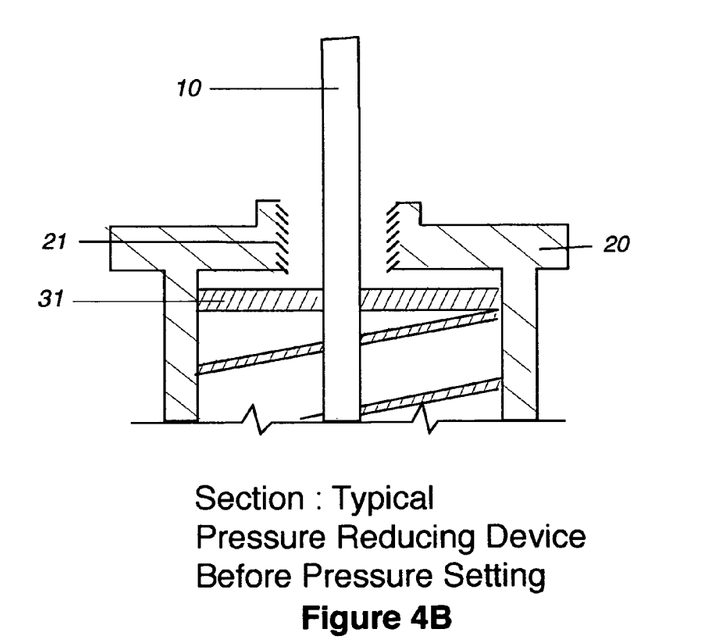

Referring to FIG. 4B, a sectional view of a typical pressure reducing valve is depicted in a stripped down view before application indicating a flow restriction means 31 an engagement and adjustment means with the valve containment body portion 21, and a rotational actuation portion 10.

Figure 5A:
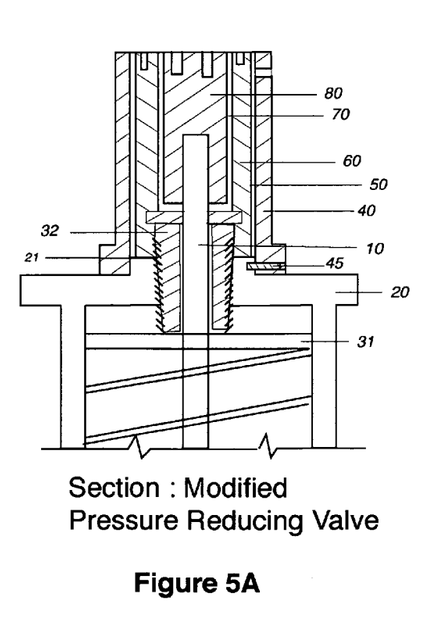
FIG. 5 illustrates a sectional view the modified pressure reducing valve system configuration according to the present invention.

Referring to FIG. 5A, a sectional view of a typical pressure reducing valve system has been modified utilizing a keyed actuation module 80 fit to the existing rotational activating portion 10, a second keyed rotational locking module 60, and adjustment screw 32, a bearing system 50 & 70 allowing unrestricted rotation, a closure module 40, and tamperproof attachment 45 for securing the non rotatable closure module to the valve containment body 20, a means of engagement 21 between the adjustment screw 32 and the containment module 20, a means of restricting flow of 31. Wherein a rotational force can only be applied by means of a keyed wrench system; the rotational force applied to the keyed actuation module 80 shall actuate the flow of Liquid and/or gas, and the second rotational force applied to the keyed rotational locking module 60 shall actuate the means of restricting flow 31.

Figure 5B:
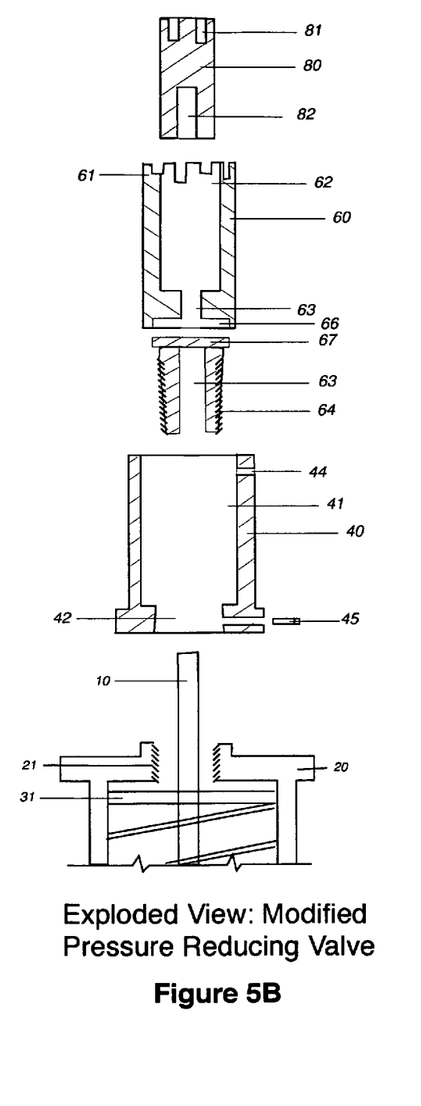

Referring to FIG. 5B, an exploded assembly view of the pressure reducing valve system has been modified utilizing the keyed actuation module 80, having a first keyed portion 81 and a second keyed portion 82 to fit over and around the rotational actuation portion 10, a keyed rotational locking module 60, having a first keyed portion 61 and a second keyed portion 66, an opening 62 for receiving the keyed actuation module 80, an opening 63 for receiving the rotational actuation portion 10, the second keyed portion 66 shaped for receiving and engaging a keyed portion 67 of the adjusting screw 32 having an opening for receiving the rotational actuation portion 10 and a means for engagement 64 of the valve containment body portion 21 thereby adjusting the flow restriction means 31, a closure module 40 having an opening 41 for receiving the keyed locking portion 60 and an opening for receiving the valve containment body 20, a weep system 44 and a means of attachment 45 to the valve containment body portion 20. Wherein a rotational force can only be applied by means of a keyed wrench system; the rotational force applied to the keyed actuation module 80 shall actuate the flow of Liquid and/or gas, and the second rotational force applied to the keyed rotational locking module 60 shall actuate the means of restricting flow. Wherein a rotational force can only be applied by means of a keyed wrench system; the rotational force applied to the keyed actuation module 80 shall actuate the flow of Liquid and/or gas, and the second rotational force applied to the keyed rotational locking module 60 shall engage a keyed portion 67 of the adjusting screw 32 thereby actuating the means of restricting flow 31.

Figure 6A:
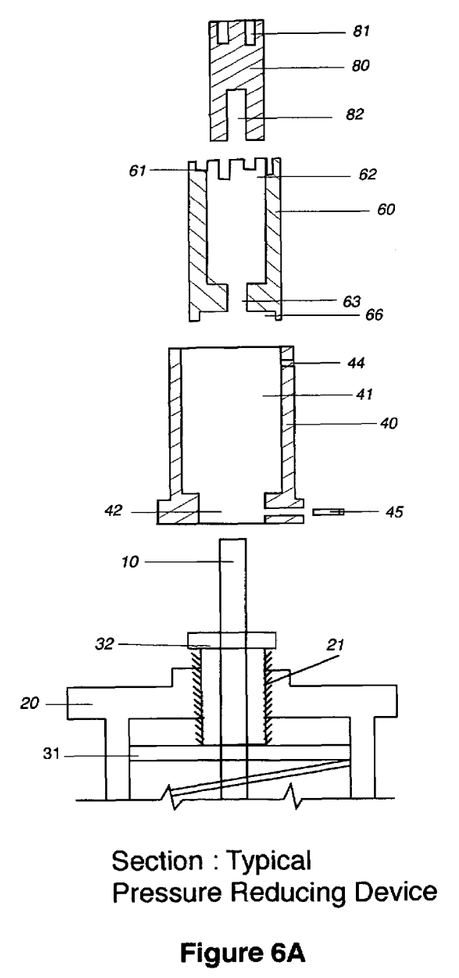
FIG. 6 illustrates a sectional view the modified pressure reducing valve system configuration according to the present invention.

Referring to FIG. 6A, an exploded assembly view of the typical pressure reducing valve system has been modified utilizing the keyed actuation module 80, having a first keyed portion 81 and a second keyed portion 82 to fit over and around the rotational actuation portion 10, a keyed rotational locking module 60, having a first keyed portion 61 and a second keyed portion 66, an opening 62 for receiving the keyed actuation module 80, an opening 63 for receiving the rotational actuation portion 10, the second keyed portion 66 shaped for receiving and engaging a keyed adjustment screw 32 having an opening for receiving the rotational actuation portion 10 and a means for engagement of the valve containment body portion 21 thereby adjusting the flow restriction means 31, a closure module 40 having an opening 41 for receiving the keyed locking portion 60 and an opening 42 for receiving the valve containment body 20, a weep system 44 and a means of attachment 45 to the valve containment body portion 20. Wherein a rotational force can only be applied by means of a keyed wrench system; the rotational force applied to the keyed actuation module 80 shall actuate the flow of Liquid and/or gas, and the second rotational force applied to the keyed rotational locking module 60 shall engage a keyed portion 65 of the keyed rotational locking module 60 thereby engaging the adjusting screw 32 and actuating the means of restricting flow 31.

Figure 6B:
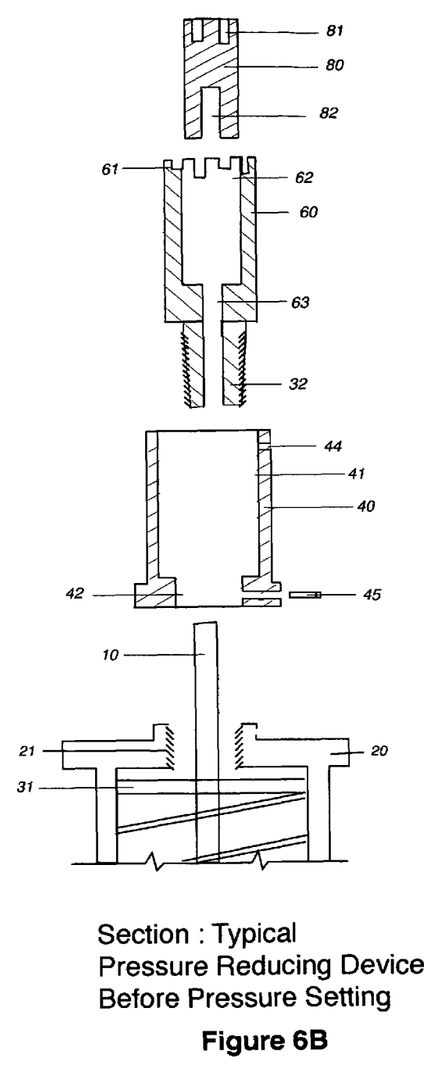

Referring to FIG. 6B, an exploded assembly view of the typical pressure reducing valve system has been modified utilizing the keyed actuation module 80, having a first keyed portion 81 and a second keyed portion 82 to fit over and around the rotational actuation portion 10, a keyed rotational locking module 60, having a first keyed portion 61, an opening 62 for receiving the keyed actuation module 80, an opening 63 for receiving the rotational actuation portion 10, whereby adjustment screw 32 has been monolithically incorporated into the keyed rotational locking module 60 providing a means for engagement of the valve containment body portion 21 thereby adjusting the flow restriction means 31, a closure module 40 having an opening 41 for receiving the keyed rotational locking module 60 and an opening 42 for receiving the valve containment body 20, a weep system 44 and a means of attachment 45 to the valve containment body portion 20. Wherein a rotational force can only be applied by means of a keyed wrench system; the rotational force applied to the keyed actuation module 80 shall actuate the flow of Liquid and/or gas, and the second rotational force applied to the keyed rotational locking module 60 shall actuate the means of restricting flow 31.

Figure 7A:
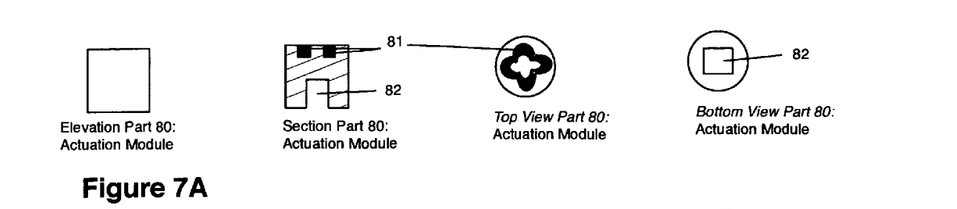
FIG. 7 illustrates the component parts of the pressure reducing valve system configuration according to the present invention.

Referring to FIG. 7A, a keyed actuation module 80 is depicted in Elevation, Section depicting keyed portions 81 and 82, Top View depicting keyed portion 81, and Bottom View depicting keyed portion 82.

Figure 7B:
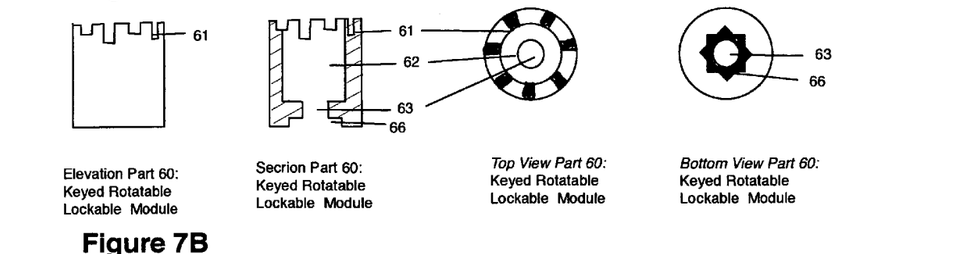

Referring to FIG. 7B, a keyed rotatable locking module 60 is depicted in Elevation indicating a keyed portion 61, Section depicting the keyed portions 61 and 66,a recessed portion for receiving the keyed actuation module 80, and the opening 63 for receiving the rotatable actuation portion 10, Top View depicting the keyed rotatable locking portion 61, the recessed portion 62 for receiving the keyed actuation module 80, and the opening 63 for receiving the rotatable actuation portion 10, Bottom View depicting the keyed portion 66, and the opening 63 for receiving the rotatable actuation portion 10.

Figure 7C:
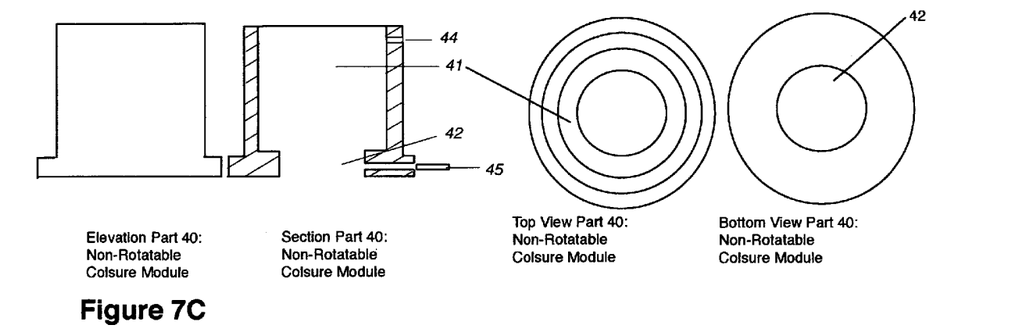

Referring to FIG. 7C, a non rotatable closure module 40 is depicted in Elevation, Section depicting a recess 42 for attachment to a valve containment Body 20, a recess 41 for receiving the keyed rotatable locking module 60, a engagement portion 43, a weep system 44, a means of attachment 45 to the valve containment body 20, Top View depicting the a recess 41 for receiving the keyed rotatable locking module 60, Bottom View depicting the a recess 42 for attachment to a valve containment Body 20.

Figure 7D:
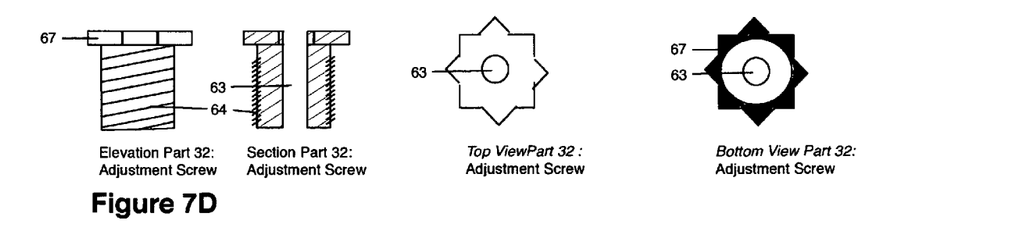

Referring to FIG. 7D, a keyed adjustment screw is depicted in Elevation indicating a means of adjusting 64 and a keyed portion 67, Section depicting the opening 63 for receiving the rotatable actuation portion 10, Top View depicting the keyed portion 67 and the opening 63 for receiving the rotatable actuation portion 10, Bottom View depicting the keyed portion 67, the opening 63 for receiving the rotatable actuation portion 10 and the means of adjusting 64.

Figure 8A:
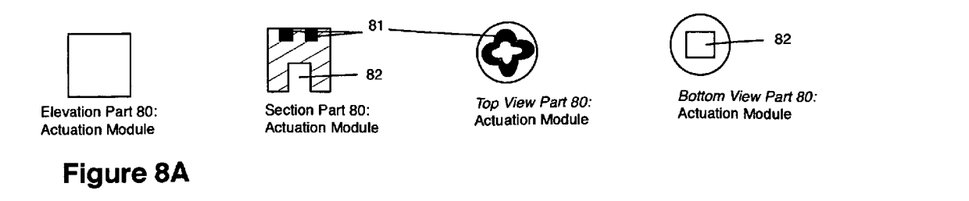
FIG. 8 illustrates the component parts of the standard valve system configuration according to the present invention.

Referring to FIG. 8A, a keyed actuation module 80 is depicted in Elevation, Section depicting keyed portions 81 and 82, Top View depicting keyed portion 81, and Bottom View depicting keyed portion 82.

Figure 8B:
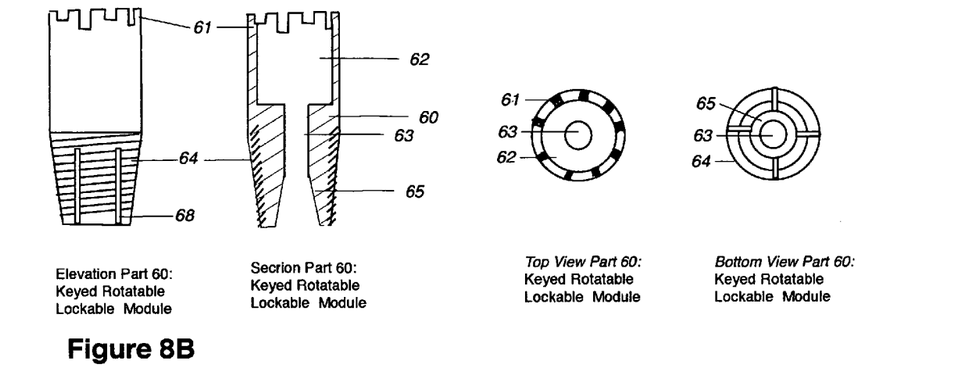

Referring to FIG. 8B, a keyed rotatable locking module 60 is depicted in Elevation indicating a keyed portion 61, a means of adjusting 64, a removed area 68 to allow for compression, Section depicting the keyed portions 61,a recessed portion 62 for receiving the keyed actuation module 80, and the opening 63 for receiving the rotatable actuation portion 10, a tapered portion 65 to allow for compression, and a means of adjusting 64, Top View depicting the keyed rotatable locking portion 61, the recessed portion 62 for receiving the keyed actuation module 80, and the opening 63 for receiving the rotatable actuation portion 10, Bottom View depicting the tapered portion 65, and the opening 63 for receiving the rotatable actuation portion 10, and the means of adjusting 64.

Figure 8C:
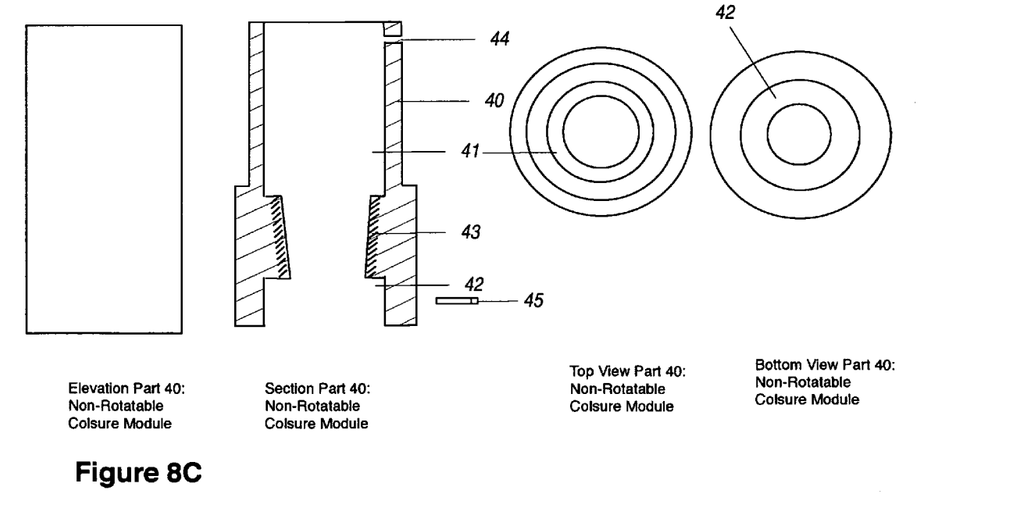

Referring to FIG. 8C, a non rotatable closure module 40 is depicted in Elevation, Section depicting a recess 42 for attachment to a valve containment Body 20, a recess 41 for receiving the keyed rotatable locking module 60, a engagement portion 43, a weep system 44, a means of attachment 45 to the valve containment body 20, Top View depicting the a recess 41 for receiving the keyed rotatable locking module 60 and the engagement portion 43, Bottom View depicting the a recess 42 for attachment to a valve containment Body 20 and the engagement portion 43.

Figure 9A:
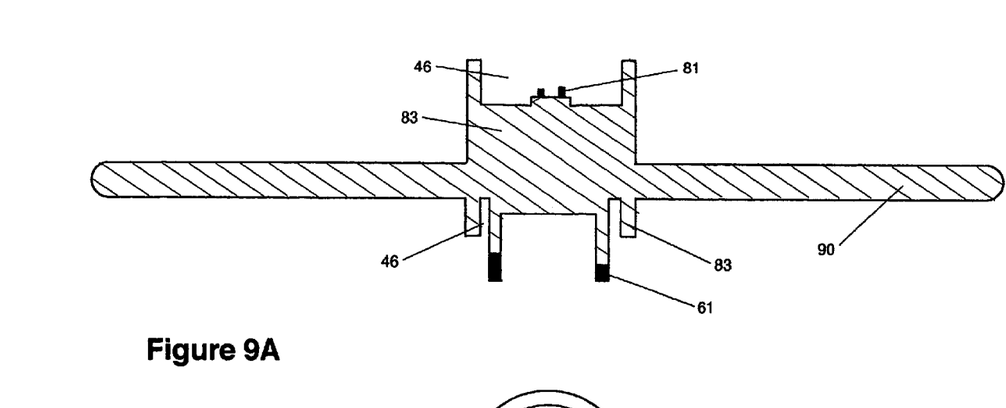
FIG. 9 illustrates the keyed actuation wrench according to the present invention.

Referring to FIG. 9A, a sectional view of a keyed valve wrench has been depicted indicating a first keyed opening extension 81 identical to the keyed opening in the keyed rotatable actuation module (FIG. 2, detail 2, FIG. 5, detail 2, FIG. 6, details 1 and 2, FIG. 7, detail 1, and FIG. 8, detail 1), a second keyed opening extension 61 identical to the keyed opening in the keyed rotatable locking module (FIG. 2, detail 2, FIG. 5, detail 2, FIG. 6, details 1 and 2, FIG. 7, detail 2, and FIG. 8, detail 2), a wrench body 83, with an integral wrench handle 90.

Figure 9B:
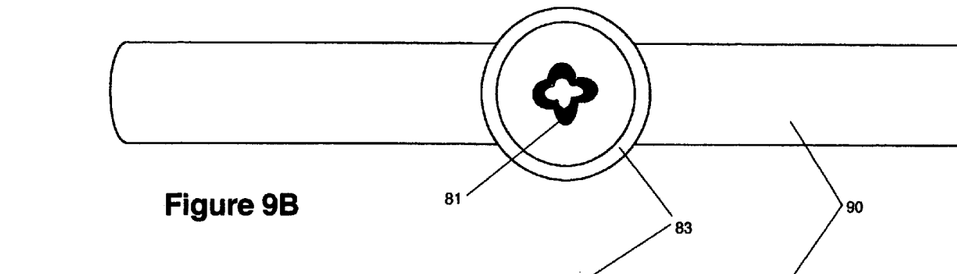

Referring to FIG. 9B, a plan view of a keyed valve wrench has been depicted indicating the first keyed opening extension 81 identical to the keyed opening in the keyed rotatable actuation module (FIG. 2, detail 2, FIG. 5, detail 2, FIG. 6, details 1 and 2, FIG. 7, detail 1, and FIG. 8, detail 1), a keyed opening extension a wrench body 83, with an integral wrench handle 90.

Figure 9C:
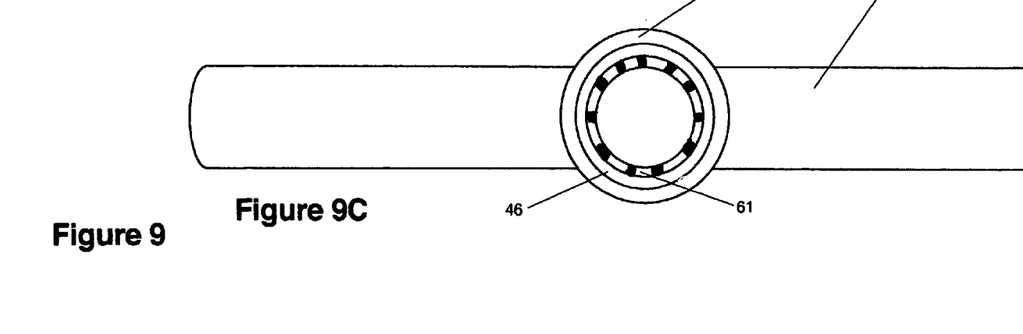

Referring to FIG. 9C, a plan view of a keyed valve wrench has been depicted indicating the first keyed opening a second keyed opening extension 61 identical to the keyed opening in the keyed rotatable locking module (FIG. 2, detail 2, FIG. 5, detail 2, FIG. 6, details 1 and 2, FIG. 7, detail 2, and FIG. 8, detail 2), a keyed opening extension a wrench body 83, with an integral wrench handle 90.

The present invention may be implemented using existing valve systems with minor modifications according to the teachings of the present specification, as will be apparent to those skilled in the manufacture of valve systems. Appropriate hardware can readily be prepared by those skilled in the art based on the teachings of the present disclosure, as will be apparent to those skilled in the manufacturing and assembly arts. The invention may also be implemented by the preparation of application specific integrated manufacturing as will be apparent to those skilled in the art.

Although the preferred embodiment of the present invention is described in terms of utilizing a bearing system between the keyed actuation module, the keyed rotatable locking module, and the non rotatable closure module; the ability to rotate either/or the keyed actuation module or the keyed rotatable locking module independently while the closure module is in place could be accomplished by utilizing a specific clearance between the moving parts and/or complimentary offsets between the moving parts to guard against removing either module as would be apparent to those skilled in the art of mechanical engineering.

Although the preferred embodiment of the present invention is described in terms of an irregular recess to act as a key opening on the actuation module and a recessed and/or projected portion to key the opening of the rotatable locking module; the key openings could be any recessed or projected shape capable of withstanding the stress and sheer forces exerted upon the keyed valve wrench opening extensions and keyed actuation module opening and/or keyed rotatable locking module opening during rotation to actuate the valve as would be apparent to those skilled in the art of mechanical and structural engineering.

Although the preferred embodiment of the present invention is described in terms of a keyed valve wrench with key opening extensions, wrench body, and integral wrench handle; the key opening extension could be manufactured as a set typical wrench socket, as will be apparent to those skilled in the art.

Although the preferred embodiment of the present invention is described in terms of the Keyed rotatable locking module actuating a flow restricting portion, additional keyed rotatable locking portions could be utilized to secure the rotatable actuation portion as would be apparent to those skilled in the art.

Although the preferred embodiment of the present invention is described in terms of the Keyed rotatable locking module actuating a flow restricting portion, the keyed rotatable locking portion could act to actuate other rotatable portions of the valve system as would be apparent to those skilled in the art.

Although the preferred embodiment of the present invention is described in terms of a manual keyed valve wrench with key opening extensions; the keyed valve wrench socket set with key opening extensions could be operated by means of a pneumatic, hydraulic, electric, etc. socket driver as would be apparent to those skilled in the arts.

Although the preferred embodiment of the present invention is described in terms of attaching the non rotatable closure module to the existing valve containment body by means of tamperproof attachments; the attachment could be accomplished by means of welding, riveting, epoxies, etc. as would be apparent to those skilled in the arts.

Although the preferred embodiment of the present invention is described in terms of pre assembling the keyed actuation module, the keyed rotatable locking module, the non rotatable closure module, and bearing system and then attaching the system to an existing valve containment body; the system could be assembled and installed at the location of the valve containment body to be modified as would be apparent to those skilled in the arts.

Although the preferred embodiment of the present invention is described in terms of fitting the keyed actuation module over the rotatable actuation portion; the keyed actuation module could be mechanically fastened to the existing rotatable actuation portion by means of welding, riveting, screwing, epoxies, etc. as would be apparent to those skilled in the arts.

Although the preferred embodiment of the present invention is described in terms of a single keyed rotatable locking module, a plurality of keyed, rotatable locking modules could be incorporated to lock the valve rotatable actuation portion of the valve system as would be apparent to those skilled in the art.

The method and system of the present invention is functional because it limits the ability to open the supply/ flow portion independently of the flow restriction portion to only those personnel who poses the appropriate keyed valve wrenches, it is reliable because the working parts require very little maintenance beyond what is already necessary in the existing system, it is effective because the rotational actuation portion and the pressure adjustment portions and operation therefrom is not readily accessible to any member of the public wishing to engage the supply/flow and/or the flow restriction; therefore reducing the possibility of accidental actuation of either part of the valve system by avoiding public negligence.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A secure retrofit mechanism for a valve device that includes valve body having a rotatable actuating portion extending outwardly therefrom and attached to a lower valve stem which is connected to a valve member at the opposite end, said secure mechanism comprising: a non-rotatable protective module defined by a wall that is adapted to be positioned over and around at least a portion of the valve body with an opening through the non-rotatable containment module for receiving a bearing system, a keyed rotatable actuating module, a keyed rotatable locking module, and a compression stop module, said actuating, and compression stop modules are operatively connected to the lower valve stem; and a means for coupling said non-rotatable containment module to said valve body; and a means for coupling said non-rotatable containment module to said compression stop module; and said compression stop module having, an opening for receiving and engaging said lower valve actuation portion, said compression stop module having a projection or recess with a plurality of elements in the top portion for receiving and engaging said keyed rotatable locking module, said compression stop module having a threaded/lacerated portion in the bottom for engaging said non-rotatable containment module and said lower valve stem actuating portion to prevent rotation; and a first bearing means disposed between said non-rotatable containment module and said keyed rotatable locking module for reducing friction and protecting against infiltration of foreign elements; and said keyed rotatable locking module being flush with a top portion of said non-rotatable containment module, said keyed rotatable locking module having a taper bottom portion thereof for engaging said non-rotational containment module, wherein said keyed rotatable locking module covering said lower valve stem actuation portion and positions between said lower valve stem actuation portion and non-rotatable containment module, such that a compression force restrict the rotation of the lower valve stem actuation portion, and a key-way either recessed or projected with a plurality of elements on the top portion of said keyed rotatable locking module; and a second bearing means disposed between said keyed rotatable locking module and said keyed rotatable actuation module for reducing friction and protecting against infiltration of foreign elements; and said keyed rotatable actuation module being flush with a top portion of said non-rotatable containment module, said keyed rotatable actuation module having a recess in the bottom portion thereof for covering and engaging the lower valve stem actuating portion, and a key-way either recessed or projected with a plurality of elements on the top portion of said keyed rotatable actuating module; and a keyed valve wrench system having a plurality of projected or recessed elements on a bottom portion thereof for engaging the keyed rotatable actuation module actuating recessed or projected key-way elements for rotating the lower valve stem portion to actuate the valve member by applying a rotational force on a keyed valve wrench, such that the rotational force cause by a rotational moment on the actuating module; and said keyed valve wrench system having a plurality of projected or recessed elements on a top portion thereof for engaging the keyed rotatable locking module recessed or projected key-way elements for rotating said keyed rotatable locking module, by means of a rotational force applied to the compression stop module thereby limiting rotation of the lower valve stem actuation portion.

2. The secure retrofit mechanism according to claim 1, wherein the top of the non-rotatable containment module, the bearings, the keyed rotatable actuation module, and the keyed rotatable locking module in the assembled condition, are substantially flush with one another constituting an assembly.

3. The secure retrofit mechanism according to claim 2, wherein the keyed rotatable actuation module, bearings, keyed rotatable locking module, and non-rotatable containment module can be pre-assembled and fit together as a unit to aid in alignment for attaching the mechanism to retrofit several different designs of existing valves systems.

4. The secure retrofit mechanism according to claim 1, wherein the bottom portion of the non-rotatable containment module is attached to the valve body by means of epoxy, screws, bolts or welding to achieve a non-rotatable state.

5. The secure mechanism according to claim 1, wherein the bearings and the keyed rotatable actuation module and the keyed rotatable locking module can be removed independently from the non-rotatable containment module or valve body containment portion for servicing or replacement.

6. The secure mechanism according to claim 1, wherein the assembly is acting to limit access and protect the surface area available for actuation of said lower valve portions.

7. The secure mechanism according to claim 1, wherein either and both bearings could be optional depending upon the sizes and materials being utilized for the non-rotatable containment module or valve body containment portion, the keyed rotatable locking module, and the keyed rotatable actuation module.

8. The secure mechanism according to claim 1, wherein the valve is actuated by a first rotational motion of the keyed rotatable locking module and then a second rotational motion of the keyed rotatable actuation module by the keyed valve wrench.

9. The secure mechanism according to claim 1, wherein permanently attached wrench extensions can be added to the wrench handle for further engaging said lower valve actuating portions and/or compression stop module when either or the bearings, the keyed rotatable actuation module, and keyed rotatable locking module are removed.

10. The secure mechanism according to claim 1, wherein any number of keyed rotatable locking modules could be employed lock the actuation portion to further enhance security.

11. The secure mechanism according to claim 1, wherein any number of keyed rotatable locking modules could be employed to adjust the pressure of the valve system as well as lock the actuation portion.

12. The secure apparatus according to claim 1, wherein the compression stop module could be modified to act on any number of other rotatable lower valve parts for actuation and adjustment.

13. The secure mechanism according to claim 1, wherein the keyed rotatable actuating module could be integrated into the fabrication of the lower valve actuating portion.

14. The secure mechanism according to claim 1, wherein the assembly could be accomplished by replacing said rotatable valve device actuating portion with a keyed rotatable actuating portion creating a flush condition between the keyed rotatable actuating portion, the keyed rotatable keyed locking module, and the valve body containment portion.

15. The secure mechanism according to claim 1, wherein the secure valve mechanism can be employed to various types of valve devices by means of a keyed actuating portion, and one or a plurality of keyed rotatable locking module(s) which is/are substantially flush with the non rotatable containment module or valve body containment portion.

16. A secure valve mechanism for a valve device that includes valve body having a rotatable actuating portion attached to a lower valve stem portion which is connected to a valve member at the opposite end, said secure valve mechanism comprising: a valve body with a valve body containment portion for receiving a bearing system, a keyed rotatable actuating module, a keyed rotatable locking module, and a compression stop module, said actuating, and compression stop modules are operatively connected to the lower valve stem; and a means for coupling said valve body containment portion to said compression stop module; and said compression stop module having an opening for receiving and engaging said lower valve actuation portion, said compression stop module having a projection or recess with a plurality of elements in the top portion for receiving and engaging said keyed rotatable locking module, said compression stop module having a threaded/lacerated portion in the bottom for engaging said non-rotatable containment module and said lower valve stem actuating portion to prevent rotation; and a first bearing means disposed between said valve body containment portion and said keyed rotatable locking module for reducing friction and protecting against infiltration of foreign elements; and said keyed rotatable locking module being flush with a top portion of said valve body containment portion, said keyed rotatable locking module having a recess in the bottom portion thereof for covering and engaging a compression stop module to restrict rotation of the lower valve stem actuating portion, and a key-way either recessed or projected with a plurality of elements on the top portion of said keyed rotatable locking module; and a second bearing means disposed between said keyed rotatable locking module and said keyed rotatable actuation module for reducing friction and protecting against infiltration of foreign elements; and said keyed rotatable actuation module being flush with a top portion of said valve body containment portion, said keyed rotatable actuation module having a recess in the bottom portion thereof for covering and engaging the lower valve stem actuating portion, and a key-way either recessed or projected with a plurality of elements on the top portion of said keyed rotatable actuating module; and a keyed valve wrench system having a plurality of projected or recessed elements on a bottom portion thereof for engaging the keyed rotatable actuation module actuating recessed or projected key-way elements for rotating the lower valve stem portion to actuate the valve member by applying a rotational force on a keyed valve wrench, such that the rotational force cause by a rotational moment on the actuating module; and said keyed valve wrench system having a plurality of projected or recessed elements on a top portion thereof for engaging the keyed rotatable locking module recessed or projected key-way elements for rotating said keyed rotatable locking module, by means of a rotational force applied to the compression stop module thereby limiting rotation of the lower valve stem actuation portion.

17. The secure valve mechanism according to claim 16, wherein a pressure adjustment module could be substituted for the compression stop module for adjusting the pressure of the valve system.

18. The secure mechanism according to claim 16, wherein the keyed rotatable locking module and the compression stop module could comprise one piece.

19. The secure mechanism according to claim 16, wherein the top of the valve body containment portion, the bearings, the keyed rotatable actuation module, and the keyed rotatable locking module, in the assembled condition, are substantially flush with one another.

20. The secure valve mechanism according to claim 16, wherein the locking module and/or the compression stop module is/are threaded in a way to cause a failsafe condition of the valve system should the keyed rotatable actuation portion be forced to rotate without first rotating the keyed rotatable locking module.

* * * * *